(12) United States Patent
Magori et al.

(10) Patent No.: US 6,297,747 B1
(45) Date of Patent: Oct. 2, 2001

(54) TOOL OR TOOL HOLDER

(75) Inventors: Valentin Magori, München; Frank Schmidt, Zorneding; Thomas Ostertag, Finsing; Gerhard Fischerauer, Pliening; Ruediger Steudte, Denkendorf; Michael Voss, Leonberg; Rudolf Bader, Esslingen, all of (DE)

(73) Assignees: Otto Bilz Werkzeugfabrik GmbH & Co., Ostfildern; Siemens Aktiengesellschaft, München, both of (DE)

(*) Notice: Subject to any disclaimer, the term of this patent is extended or adjusted under 35 U.S.C. 154(b) by 0 days.

(21) Appl. No.: 09/141,064

(22) Filed: Aug. 27, 1998

(30) Foreign Application Priority Data

Sep. 2, 1997 (DE) .............................. 197 38 229

(51) Int. Cl.$^7$ .................................................. G08C 17/00
(52) U.S. Cl. .................. 340/870.28; 340/10.1; 340/10.3; 342/42; 333/150
(58) Field of Search .............. 340/870.28, 10.1, 340/567, 10.2, 10.3; 342/42; 310/13 R, 13 D; 333/150, 153

(56) References Cited

U.S. PATENT DOCUMENTS

| | | | |
|---|---|---|---|
| 4,697,115 | * 9/1987 | Mitsutsuka | 310/313 R |
| 4,748,364 | * 5/1988 | Mitsutsuka | 310/313 D |
| 5,287,035 | * 2/1994 | Carroll | 310/313 R |
| 5,365,207 | * 11/1994 | Borras | 333/196 |
| 5,563,581 | * 10/1996 | Kats | 340/567 |
| 5,731,516 | * 3/1998 | Handfield | 73/714 |
| 5,742,237 | * 4/1998 | Bledsoe | 340/825.49 |
| 6,107,910 | * 8/2000 | Nysen | 340/10.1 |
| 6,144,332 | * 11/2000 | Reindl | 342/42 |

FOREIGN PATENT DOCUMENTS

| | | |
|---|---|---|
| 42 38 338 A1 | 5/1994 | (DE) . |
| 43 14 235 A1 | 11/1994 | (DE) . |
| 0 619 906 | 10/1994 | (EP) . |

* cited by examiner

*Primary Examiner*—Michael Horabik
*Assistant Examiner*—Albert K. Wong
(74) *Attorney, Agent, or Firm*—Michael J. Striker

(57) ABSTRACT

A tool holder for holding a tool has at least one sensor for measuring an operating parameter of the tool holder or the tool during the operation thereof and generating measured value signals which are fed to a signal processing unit for evaluation. The sensor is a surface acoustic wave sensor operating according to acoustic wave principles and its measured value signals are readable in a contactless manner by means of radio waves. The surface acoustic wave sensor requires no current supply circuit but instead draws transmission energy required for transmission of the measured value signals to the signal processing unit from a high frequency interrogation signal, that is transmitted by radio waves from the signal processing unit and is received by the surface acoustic wave sensor.

28 Claims, 3 Drawing Sheets

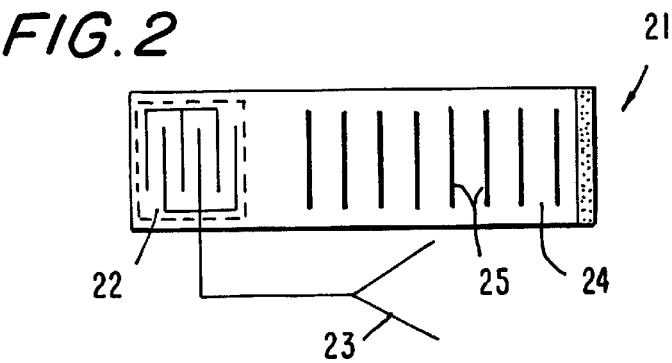
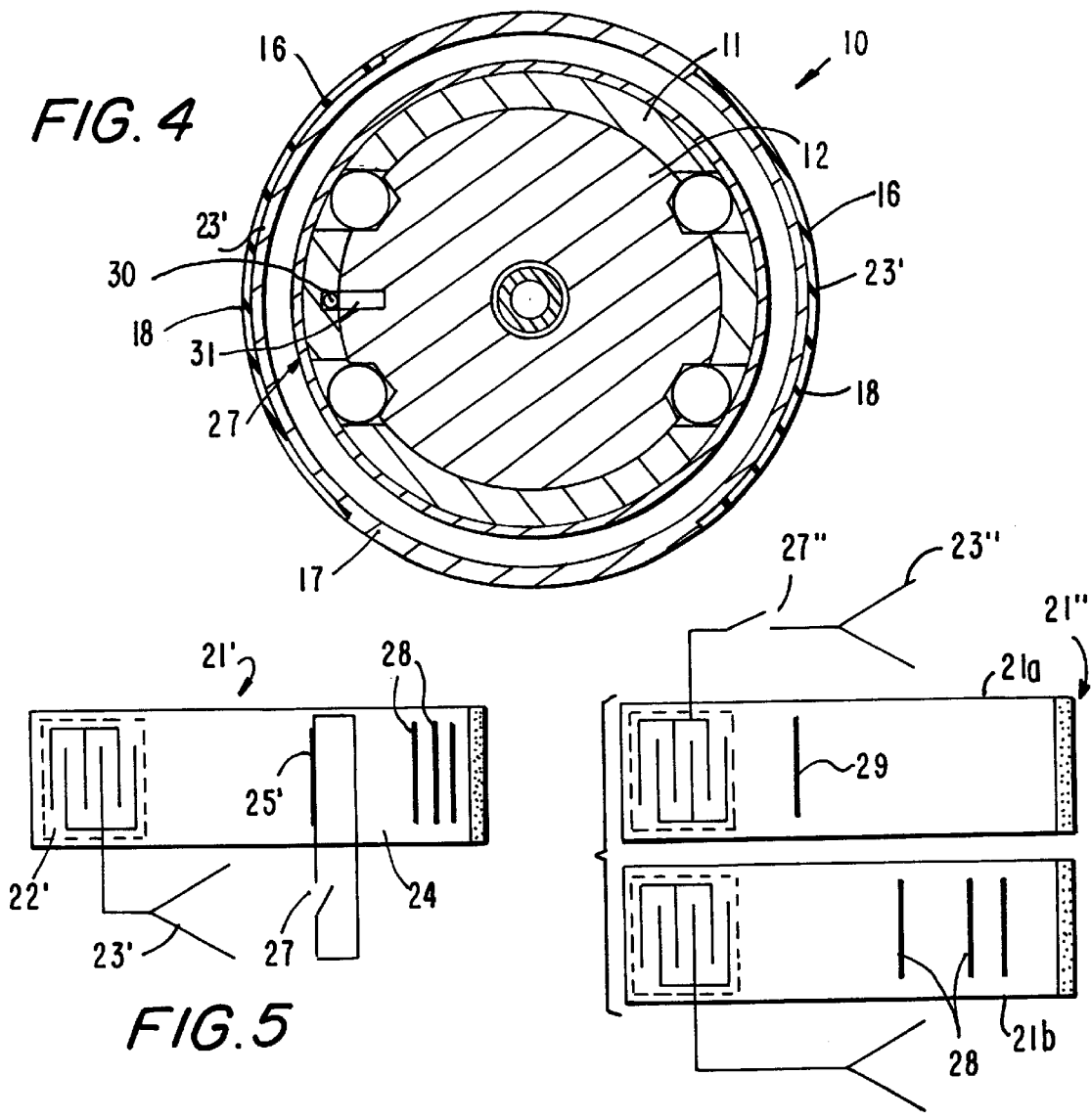

TOOL OR TOOL HOLDER

BACKGROUND OF THE INVENTION

The present invention relates to a tool or tool holder with which at least one sensor operating in a contactless manner is associated functionally and spatially whose measurement signals are input to a signal processing unit for evaluation.

A known tool holder of this type (German Patent Application DE 42 38 338 A1) is provided with an observation device for a tool in order to determine the extent of wear and/or to detect breakage of a tool in a tool holder of an operating machine. The observation device has a stationary displacement sensor that can detect a dislocation or displacement. The displacement sensor is arranged spatially fixed in the supporting housing of the tool spindle. A reference surface is provided on the rotating tool spindle spaced from it. The spacing of the reference surface from the displacement sensor depends on the force occurring during operation with the tool. If this spacing changes during operation, e.g. due to a tool breaking, it is detected by the displacement sensor in a contactless manner and is fed to an associated signal processing unit in the form of a suitable signal. The stationary displacement sensor requires an energy supply for signal production. Battery supplied sensors with VHF signal transmission or with signal transmission on an infrared basis are known. These observation devices are expensive, troublesome and already have considerable disadvantages because of the required current supply for the sensors, especially those supplied with current from batteries, because of technical considerations for the batteries.

SUMMARY OF THE INVENTION

It is an object of the present invention to provide a tool or tool holder of the above-described type which requires no energy supply, in the form of batteries, in regard to its monitoring device and makes possible a measuring or controlling monitoring of the most different physical variables directly on the tool or tool holder itself during rotational motion of it in a simple and compact manner.

These objects, and others that will be made more apparent hereinafter, are attained in a tool or tool holder of the above-described kind having at least one sensor operating in a contactless manner associated functionally and spatially with the tool or tool holder, whose measurement signals are input to a signal processing unit for evaluation.

According to the invention, the at least one sensor is a surface acoustic wave sensor operating according to surface acoustic wave principles whose measurement signals are picked off or interrogated from a remote location in a contactless manner.

Further advantageous embodiments of the invention are claimed in the dependent claims appended hereinbelow.

Surface acoustic wave sensors are known (EP 619 906 B1) electro-acoustic components. The characterizing feature of the invention, in contrast, is to provide special tools or tool holders with this type of surface acoustic wave sensor and not only use its properties of measurement and observation, but, as needed, to equip it for a controlling monitoring and to equip the tool or tool holder with it. A contactless monitoring of the widest variety of manufacturing processes in operating machines is possible using the invention by means of telemetric signal transmission and passive signal coding and reflection. Both analog variables, such as force, torque, displacement, temperature, pressure or the like, and binary signal states, can be monitored to determine, e.g. the signal state "position reached" or "threshold exceeded". The stability of processes may be controlled and a protocol established by detection of the above-named variables. The operator, the operating machine, the workpiece and/or the tool can be protected by an emergency stop in case of danger. The wear on the tool can be measured with geometrically predetermined knife edges and the tool can be used until the end of its service life. An impairment of the product quality and undesired idle time can be largely avoided. The at least one surface acoustic wave sensor is attached to the tool or the tool holder or an other part, e.g. an operating machine, which performs a process-dependent action, e.g. molding, during the working process. The at least one surface acoustic wave sensor can be interrogated, i.e. can transmit signals, by radio waves without wires. It operates maintenance-free after its installation, whereby no additional energy source, e.g. battery, is required. The one or more surface acoustic wave sensors may be interrogated in a very short time and allow a timely resolution of even very rapid mechanical processes. The measured signals (sensor signals) contain information regarding the time behavior of a possible deformation cause and thus about the quality, e.g., of a tool, of the operating process. The at least one surface acoustic wave sensor is universally useable. Since no additional electronic units are required on the sensor-side for a possible signal processing, substantial space, weight and cost savings result. Furthermore the support of the at least one surface acoustic wave sensor, also e.g. the tool, the tool holder or another part, are not noticeably weakened by introducing larger holes or cavities for support of the at least one surface acoustic wave sensor which would otherwise be required for the additional electronic units. Also the invention has a universal applicability because of that. The at least one surface acoustic wave sensor can, e.g., be attached to the upper end of a shaft in a known manner. The particular manner of mounting depends on the shaft. Previously required batteries with all their associated problems are eliminated because of the passive operation that does not require current supply. The arrangement may be formed so that the at least one surface acoustic wave sensor is protected against outside influences, e.g. against liquids and cooling agents. In case of an inner cooling supply through the shaft or the like, this cooling supply can be formed according to the specifications, without considering the arrangement of the at least one surface acoustic wave sensor. Above all it is to be understood that any of the most different types of tools, components or machine parts, e.g. in the form of a detecting tool (measuring tool), measuring tool, machining or cutting tool, clamping or gripping tool, end-of-travel tool or the like. The terms "tool" or "work tool" are to be understood in the widest sense. In the case of the end-of-travel device an end position observation of parts that are moveable relative to each other for a monitoring controller, especially machine parts, takes place by means of a surface acoustic wave sensor acting as a position structure.

Further features and advantages of the invention are described in the following description.

BRIEF DESCRIPTION OF THE DRAWING

The objects, features and advantages of the invention will now be illustrated in more detail with the aid of the following description of the preferred embodiments, with reference to the accompanying figures in which:

FIG. 2 is a schematic plan view of a surface acoustic wave sensor according to a first embodiment of a tool or work tool, e.g. that of FIG. 1;

FIG. 4 is a transverse cross-sectional view through the tool holder of FIG. 3 taken along the section line IV—IV in FIG. 3; and FIGS. 5 and 6 are respectively schematic plan views of a second and third embodiment of a tool or a tool holder, for example that of FIGS. 3 and 4.

DESCRIPTION OF THE PREFERRED EMBODIMENTS

Figure 1:
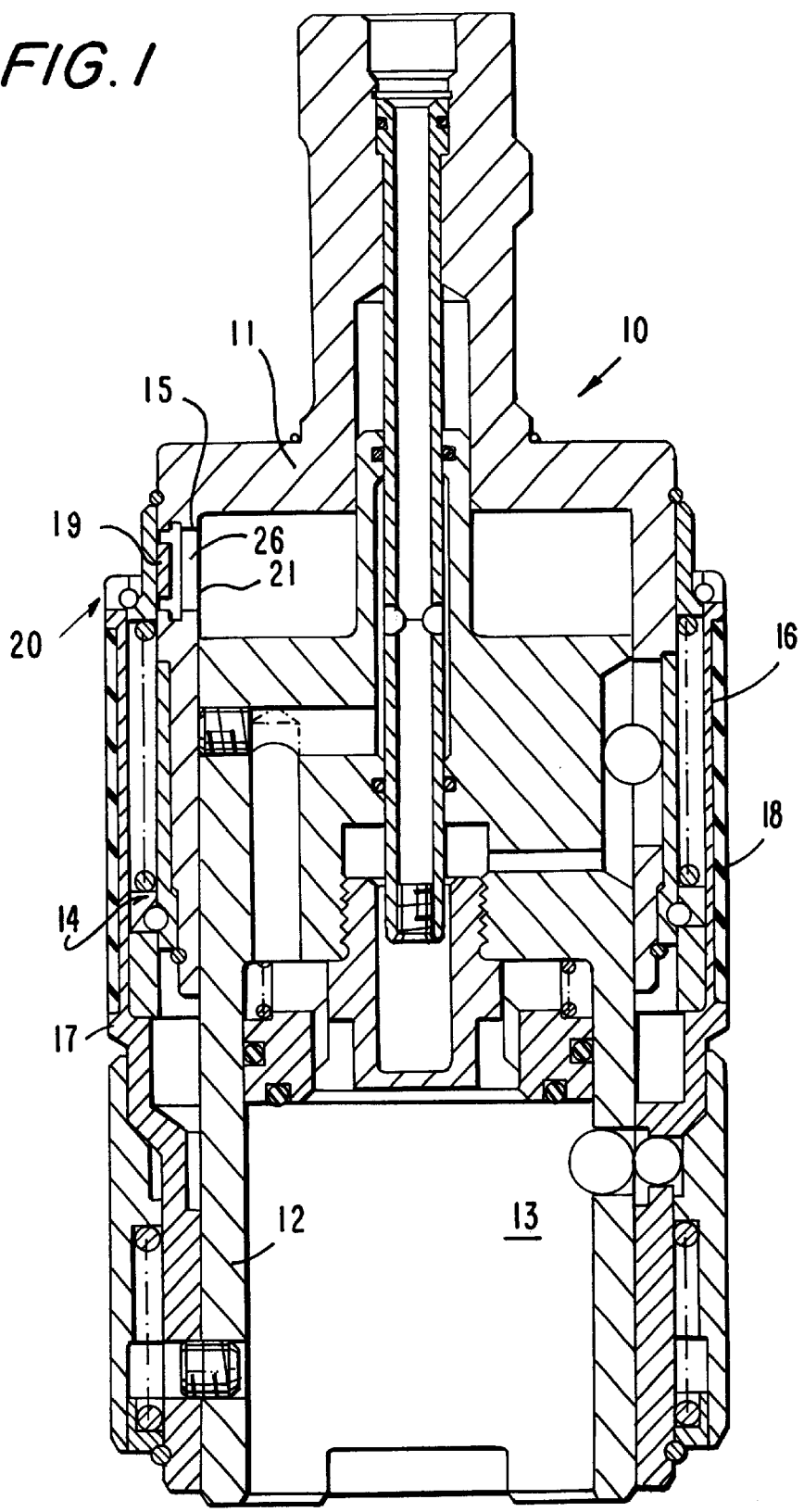
FIG. 1 is a schematic axial longitudinal cross-sectional view through a tool holder according to a first embodiment.

A tool holder 10 is shown in FIG. 1, that, e.g., is formed as shown and described in German Patent Application DE 43 14 235 A1 to which reference is made to avoid unnecessary repetition. The tool holder 10 has a shaft 11 that is received in an unshown machine spindle, tool receptacle or similar component. This tool holder 10 generally has a sleeve 12 provided with a receptacle 13 in its lower portion that receives an unshown rapidly changeable insert with a tool or else receives the tool itself. The sleeve 12 is connected with the shaft 11 for transmission of torque. Furthermore length compensating devices 14 can be provided between the shaft 11 and the sleeve 12, that respond to relative axial displacements of the sleeve 12 with respect to the shaft 11.

The tool 10 shown in FIG. 1 is for example constructed as a rapidly changeable chuck, especially for cutting threads, forming threads or the like. It is understood of course that the tool holder 10 can be formed in different ways within the scope of the present invention.

At least one sensor 20 operating in a contactless manner is associated functionally and spatially with the tool holder 10. The sensor 20 only operates to monitor the tool holder 10. The sensor 20 produces and transmits a measurement signal, which is input to an unshown signal processing unit for evaluation.

The characteristic feature is that the at least one sensor 20 is formed as a passive surface acoustic wave sensor 21 operating according to the principle of an acoustic surface wave device whose measured signal is transmitted in a contactless manner by radio waves. This kind of surface acoustic wave sensor 21 according to a first embodiment is illustrated in FIG. 2. In this embodiment the sensor is used for measurement. This type of surface acoustic wave sensor 21 is known in principle from European Patent Application EP 619 906 B1 to which reference is made to avoid unnecessary repetition. This surface acoustic wave sensor is an electro-acoustic component that has a substrate with piezoelectric properties at least in a portion of its surface and finger electrode structure located in or on this surface. Acoustic waves are produced in the surface by electrical excitation originating from an electro-acoustic input-interdigital converter. These acoustic waves travel in its surface and again produce electrical signals in an electro-acoustic output-interdigital converter and are radiated as electromagnetic waves. A signal processing of the electrical signal fed into the input converter is possible in the output converter signal by selection of the structure of the converter and, if necessary, additional structures arranged on the surface. The input converter and output converter can be one and the same converter structure. The stationary signal processing structure associated with the surface acoustic wave sensor is adjusted to this sensor. It contains a transmitting portion, a receiving portion and also an analysis portion. The passive surface acoustic wave sensor 21 according to FIG. 2 contains an interdigital converter 22, which is connected with an antenna 23 and excites mechanical surfaces waves in a piezoelectric surface acoustic wave substrate 24, as soon as the antenna 23 of the associated signal processing unit (interrogating transmitter) receives an appropriate high frequency pulse. The surface acoustic waves move over the substrate 24 in the form of a piezoelectric crystal, a portion of their energy being reflected back at the reflector marks 25. These signal components again pass through the interdigital converter 22, are converted back into electrical signals and are radiated again by the antenna 23 or a second antenna as electromagnetic waves. The reflective grid 25 characteristic of the surface acoustic wave mark is impressed on the reflected signal and permits an identification of the surface acoustic wave mark. Especially the reflective grid is influenced by deformation of the substrate 24, e.g. by stresses, temperature changes or the like. The at least one surface acoustic wave sensor 21 has a sensor element in the embodiment shown in FIG. 2. In an unshown embodiment, two or more sensor elements can be provided. Many variations of the form of the surface acoustic wave sensor 21 are possible, e.g. according to EP-PS 619 906.

The at least one surface acoustic wave sensor 21 is designed for measurement. The principle of this sort of sensor 21, which operates passively is that the transmission energy required for transmission of the measured signal to the signal processing unit is available from the energy of a high frequency interrogation signal from the signal processing unit transmitted by radio waves and is received by means of the antenna 23.

The at least one surface acoustic wave sensor 21 according to FIGS. 1 and 2 can have an additional identification function, especially coding structure. Different frequencies for the measured value signal, on the one hand, and the identification signal, on the other hand, can be provided. When the tool holder 10 or instead of that any tool has not only one surface acoustic wave sensor 21 but several sensors of this type, or when several tools or tool holders 10 are present having respective surface acoustic wave sensors, respective individual frequencies can be provided for the several surface acoustic wave sensors for respective sensor identification signals, so that, e.g., an individual frequency f1 is available for one surface acoustic wave sensor 21, an individual frequency f2 is available for the next surface acoustic wave sensor and so on. A physical variable can be measured with each surface acoustic wave sensor 21. The measurement of temperatures, forces, for example feed forces, torques, pressure values, positions or the like can come into play.

In the indicated embodiment at least one surface acoustic wave sensor 21 is rigidly mounted on a shaft 11 which is part of the tool holder 10, which detects a process-dependent action during an operating process, especially by means of a temperature, force, torque, position or the like. The surface acoustic wave sensor 21 is contained in a closed housing 26 and is received in a receptacle 15 of the tool holder 10 and held in a liquid tight and fixed manner in it. As required the at least one surface acoustic wave sensor 21 is formed in a known way as a temperature-compensating sensor. The antenna 23 of the surface acoustic wave sensor 21, which is indicated only schematically in FIG. 2, comprises, e.g. a foil and is embedded protected in a recess 16 of the tool holder 10 and similar molded like the housing 26. In the embodiment shown in FIG. 1 the antenna 23 is received in an outer sleeve 17 of the tool holder 10, which is rigidly connected with the sleeve 12. The antenna 23 is covered in the outer sleeve by the cast material 18 covering the antenna 23 and is protected against external influences and above all against action of liquids. In the same way the surface acoustic wave sensor 21, for example by cast material 19.

The described embodiment generally permits monitoring of manufacturing processes in a contactless manner in machine operations by means of a telemetric signal transmission and passive signal coding and reflection. Analog variables, such as e.g. force, torque, displacement, temperature, pressure and binary signal state, such as "position reached" or "threshold values exceeded" can be observed. The stability of processes can be controlled by determining the above-named variables and the stability of processes can be controlled and a protocol can be established. In case of danger the operator can protect both the machine, the workpiece or the tool by an emergency stop. The wear on the tool can be determined with geometrically predetermined cutting blades and the tool can be used until at the end of its lifetime. A possible consideration of the product quality and the undesired idle time may be entirely avoided. The at least one surface acoustic wave sensor 21 is universally useable and is above all space saving. Because of its passive operation no battery is necessary for the supply of energy, so that all problems connected with it are avoided. Also no expensive, space-consuming electronic device in or on the tool or tool holder 10 is required for signal processing so that a simple compact and economical form results. The sensor 20 is protected against external influences based on the hermetically sealed and protected accommodation and especially against liquids, e.g. cooling means, which also provide a simpler and more reliable inner cooling feed according to the form of the tool or tool holder 10.

In the embodiment shown in FIG. 1 the measuring observation of a process-dependent deformation (stretching) in the described simple manner is possible during the operating process by means of the sensor 20 by its attachment on the shaft 11. Thus the feed force and/or the effective torque can be detected. The at least one surface acoustic wave sensor 21 is interrogated in the described manner without wires by means of radio waves. The transmission energy required for transmission of the measured value signal to the signal processing unit is made available by means of the received interrogation signal. The surface acoustic wave sensor 21 operates without an additional energy source in a maintenance-free manner. Behavior of the sensor signal during displacement of the tool holder 10 produces information regarding the reason for the deformation and thus about the quality of the tool or the process. Since this kind of surface acoustic wave sensor 21 can be interrogated in a very short time, it permits very high resolution measurements of very rapid mechanical processes. The analysis of the measured value signal can supply comprehensive information regarding the tool state. Thus a basis for deciding when the tool should be exchanged is provided.

Also when the sensor 20 is shown and illustrated with a tool holder 10 in the embodiment shown in FIG. 1, it is understood that the sensor can be arranged in a sensing tool, measuring tool, clamping tool, cutting tool or the like. This is true not only for the embodiment according to FIG. 2 for measuring observation, but equally also for the second or third embodiment illustrated next according to FIGS. 5 or 6.

In FIG. 5 a second embodiment of a surface acoustic wave sensor 21' is shown that is formed for controlling operations in contrast to FIG. 2. For parts that correspond to those in the surface acoustic wave sensor 21 of FIG. 2 equal reference numbers completed by a prime are used. The surface acoustic wave sensor 21' in FIG. 5 which differs from that in FIG. 2 has a passive switching device 27 that is formed so that it draws its circuit energy from changes in the process variables being observed and has a switching dynamics sufficient for the interrogation frequency. The switching device 27 is provided in the embodiment in FIG. 5 for switching the reflector 25'.

In FIG. 6 a third embodiment of a surface acoustic wave sensor 21" is shown, which comprises two sensor elements 21a and 21b. A switching device 27" is provided for switching an antenna 23" in the embodiment in FIG. 6. The sensor element 21b contains a coding structure indicated with 28 and has an additional identification function. Moreover it is thus possible to identify the tool or the tool holder provided for it and distinguish it from others with this surface acoustic wave sensor 21", based on different frequencies for the measured value signal and identification signal. In the embodiment shown however the machining time difference of shafts in the structural element is used at the same interrogation frequency. The echoes within discrete time intervals are evaluated. The rear reflector (detection) also supplies its signal echo at a later time point. The measured value signal and/or the identification signal of the surface acoustic wave sensor 21',21" can be influenced.

In the third embodiment of the surface acoustic wave sensor 21" in FIG. 6 the switching device 27" has a passive threshold transmitter 29 in the form of a threshold value reflector. The switching device 27" is activated on exceeding a threshold value at the tool, the tool holder, the machine part or the like, e.g. of a value for the temperature, force, torque, position or the like, and the coded response of the concerned surface acoustic wave sensor 21 is influenced by this circuit. A greater reliability for the transmission is obtained by digitizing the measured value with this method.

Figure 3:
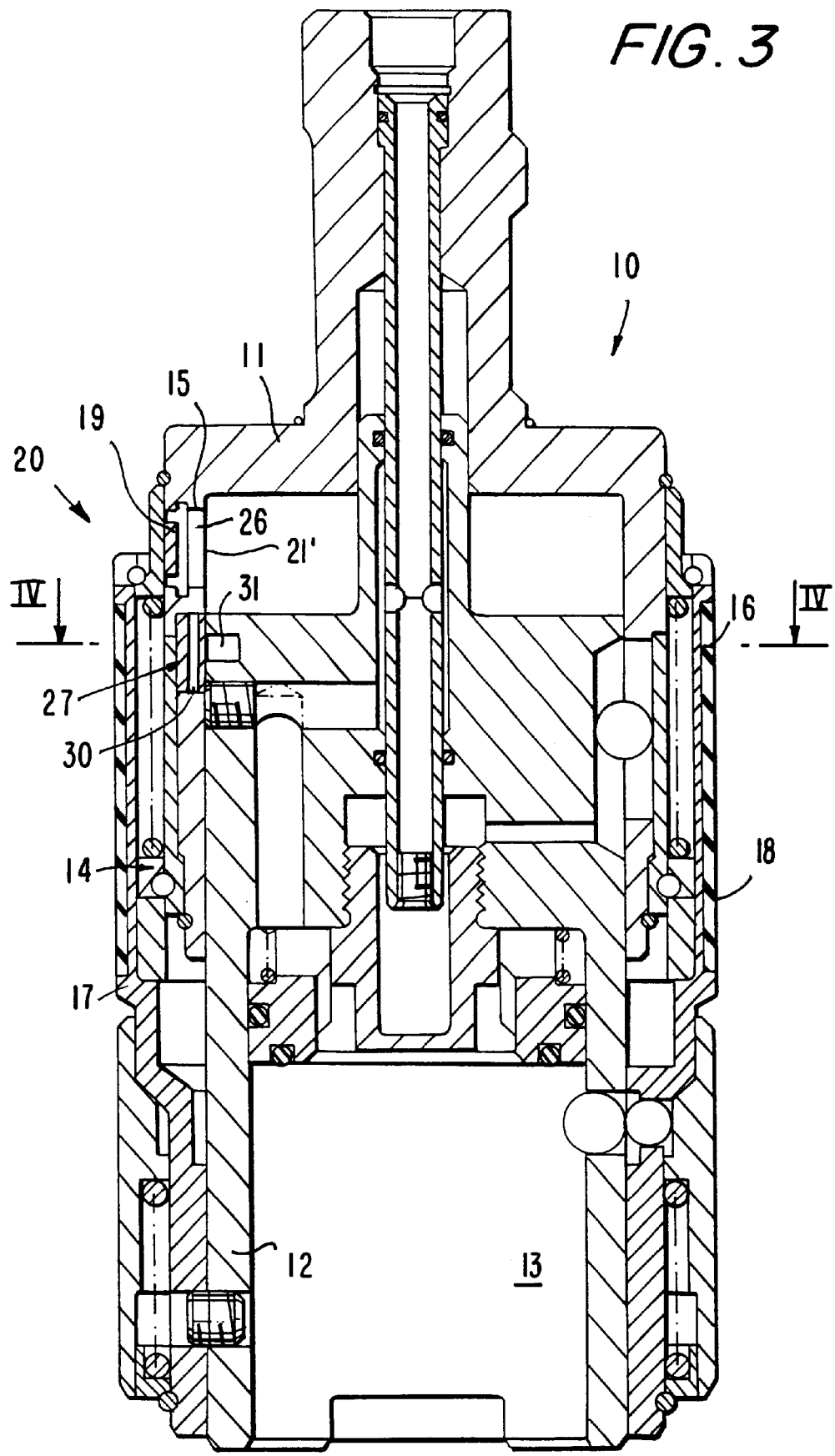
FIG. 3 is a schematic axial longitudinal cross-sectional view of a tool holder according to a second embodiment.

FIGS. 3 and 4 show an example of the same tool holder 10 as in FIG. 1 equipped with a tool holder 10 with at least one surface acoustic wave sensor formed for circuit observation. In this embodiment the apparatus has a surface acoustic wave sensor 21' in which the circuit energy is drawn from changes of the process variables being monitored, e.g. from response of the length equalizing device 14 between the shaft 11 and the sleeve 12. The switching device 27 has, e.g., a Reed contact with a coil 30, which is indicated only schematically in FIGS. 3 and 4. The reed contact 30 is formed in the usual way, e.g. contained in a glass tube. A pin-like permanent magnet 31 is associated with the Reed contact 30. The at least one surface acoustic wave sensor 21' is formed and is mounted in the same way as in FIG. 1, similarly its antenna. The reed contact 30 of the switching device 27 is arranged on a part of the tool holder 10, e.g. on its shaft 11. The permanent magnet 31 is located at a radially and axially adjacent position and is mounted on another part, e.g. the sleeve 12. The antenna 23' is contained in the recess or cavity 16 of the outer sleeve 17 forming an outer portion of the sleeve 12. The at least one surface acoustic wave sensor 21' is contained in a hermetically sealed housing 26 as in the embodiment of FIG. 1, which is received in the shaft 11.

The axial position between the reed contact 30 and the permanent magnet 31 changes to signal the exceeding of a predetermined advance force during a response of the length compensation device 14 due to an axial relative shift of the positions of the shaft 11 and the sleeve 12, 17, whereby e.g. the reflector 25' or in the case of the embodiment of FIG. 6 the antenna 23", is energized by closing of the switch. The closing of the reed contact 30 causes a pulse for the surface acoustic wave sensor 21'. The fact that the length compensation device 14 has reacted is detectable in the remote measurement value signal because of this so that a suitable reaction can occur.

It is understood that the switching device 27 comprising the reed contact 30 with the coil and permanent magnet 31 is only one example of this type of switching device 27.

In another embodiment the switching device has a resonance circuit comprising a piezoelectric element and a coil.

Also even though the use of a surface acoustic wave sensor 21' or 21" for control monitoring was illustrated using the tool holder 10 as an example, it is understood that instead of the tool holder the surface acoustic wave sensor could be provided on a tool, e.g. a detecting tool (meter), a measuring tool, a cutting tool, a clamping tool, a end-of-travel limiting tool or the like.

The disclosure in German Patent Application 197 38 229.0 of Sep. 2, 1997 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a tool or tool holder provided with a contactless sensor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A tool holder for holding a tool in combination with at least one sensor for monitoring operation of the tool holder, comprising: the tool holder including operating parts; said at least one sensor being a surface acoustic wave sensor provided on at least one of said operating parts and including first means for measuring an operational parameter of the holding tool and generating signals corresponding to said operational parameter of the holding tool measured by said first means and transmitting said signals in a contactless manner, and second means for receiving said signals from said first means in said contactless manner; and supplying said signals to a signal processing unit for evaluation of said operational parameter.

2. The tool holder as defined in claim 1, wherein said second means includes means for interrogating said at least one surface acoustic wave sensor by radio waves.

3. The tool holder as defined in claim 1, wherein said at least one surface acoustic sensor is provided with at least one antenna.

4. The tool holder as defined in claim 1, wherein said at least one surface acoustic wave sensor includes means for transmission of said signals to said signal processing unit from energy of a high frequency interrogation signal produced in said signal processing unit by radio waves.

5. The tool holder as defined in claim 1, wherein said at least one surface acoustic wave sensor includes means for measuring observation.

6. The tool holder as defined in claim 1, wherein said at least one surface acoustic wave sensor includes additional identification means for generating an identification signal including information regarding an identification code.

7. The tool holder as defined in claim 6, wherein the signals corresponding to said measured operational parameters and said identification signal have different frequencies.

8. The tool holder as defined in claim 7, wherein a plurality of the surface acoustic wave sensors are provided on the operating parts of the tool holder and each each acoustic wave sensor has a different identification frequency.

9. The tool holder as defined in claim 8, wherein said at least one surface acoustic wave sensor is rigidly mounted on a shaft of the tool holder and includes means for detecting an operation-dependent parameter to be measured during an operation of the tool holder by measuring at least one of temperature, force, torque and position thereof.

10. The tool holder as defined in claim 1, wherein said at least one surface acoustic wave sensor is formed as a temperature-compensating sensor.

11. The tool holder as defined in claim 1, wherein said at least one surface acoustic wave sensor has a hermetically closed housing.

12. The tool holder as defined in claim 11, wherein said housing is held in a receptacle of the tool holder in a fixed and fluid-tight manner.

13. The tool holder as defined in claim 3, wherein said at least one antenna is protectively received in a recess provided in the tool holder and is held therein in a fixed and fluid-tight manner.

14. The tool holder as defined in claim 1, wherein said at least one surface acoustic wave sensor monitors an operation-variable parameter and includes at least one passive switching device for monitoring, said at least one passive switching device including means for deriving energy for said switching device from changes in said operation-variable parameter being measured.

15. The tool holder as defined in claim 14, wherein said at least one passive switching device has means for switching a reflector of said at least one surface acoustic wave sensor.

16. The tool holder as defined in claim 14, wherein said at least one passive switching device has a switch for switching an antenna of said at least one surface acoustic wave sensor.

17. The tool holder as defined in claim 14, wherein said at least one surface account wave sensor includes additional identification means for generating an identification signal including information regarding an identification code and said at least one passive switching device includes means for influencing at least one of a signal corresponding to said measured operational parameter and said identification signal.

18. The tool holder as defined in claim 14, wherein said at least one passive switching device has a threshold transmitter.

19. The tool holder as defined in claim 14, wherein said at least one passive switching device has a reed contact with a coil.

20. The tool holder as defined in claim 19, wherein said at least one passive switching device has a permanent magnet for activation of the reed contact.

21. The tool holder as defined in claim 14, wherein said at least one passive switching device comprises a resonance circuit including a coil and a piezoelectric element.

22. The tool holder as defined in claim 1, wherein said tool is selected from the group consisting of a detection tool, a measuring tool, a cutting tool, a clamping tool and an end-of-travel limiting tool.

23. The tool holder as defined in claim 1, further comprising a rapidly changeable chuck for cutting or shaping screw threads.

24. The tool holder as defined in claim 23, further comprising a shaft receivable in a receptacle of a machine spindle, a sleeve connected to said shaft and having means for receiving a rapidly changeable insert with said tool; and a length compensating device for compensating for an axial relative shift of said shaft and said sleeve connected to said shaft, and wherein said at least one surface acoustic wave sensor has an antenna and a switching device including means for responding to the length compensating device as a sign for exceeding a predetermined advance force of the tool in order to switch one of an antenna and a reflector of said at least one surface acoustic wave sensor.

25. The tool holder as defined in claim 24, wherein said switching device has a reed contact on one operating part and a permanent magnet on another operating part which is axially and radially adjacent to the reed contract.

26. The tool holder as defined in claim 25, wherein said one operating part having the reed contact is said shaft and said another operating part having the permanent magnet is said sleeve.

27. The tool holder as defined in claim 25, wherein said antenna is an approximately ring-like element contained in a recess of an outer portion of said sleeve.

28. The tool holder as defined in claim 24, wherein said at least one surface acoustic wave sensor is hermetically sealed in a housing and said housing is received is said sleeve.

* * * * *